Sept. 9, 1952  W. P. KESSEL ET AL  2,609,894
SELF-POWERING FLUID BRAKE

Filed July 12, 1949  5 Sheets-Sheet 1

INVENTORS
WILLIAM P. KESSEL &
JOHN F. SHAFER.
BY
Munn, Liddy & Glaccum
ATTORNEYS.

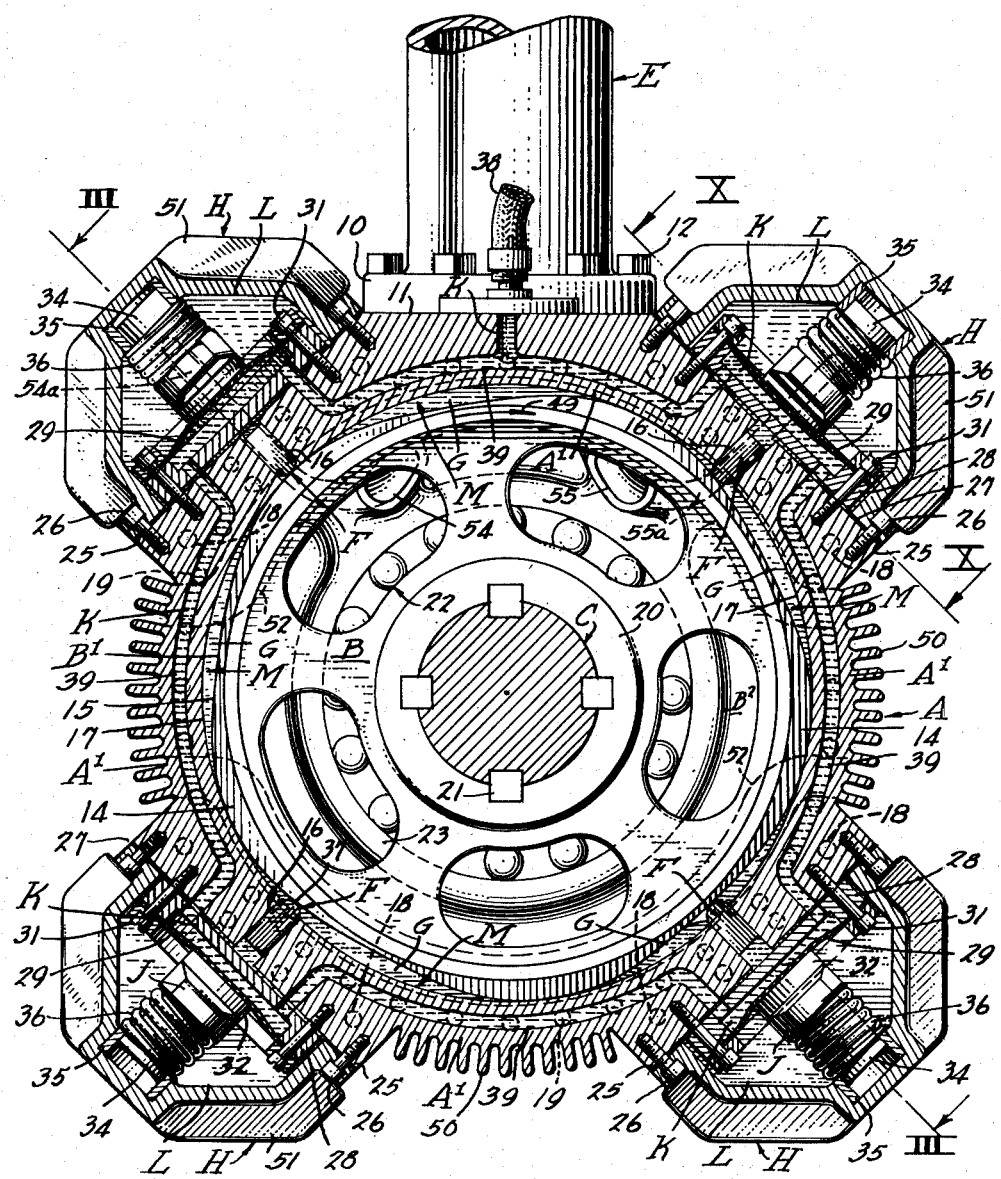

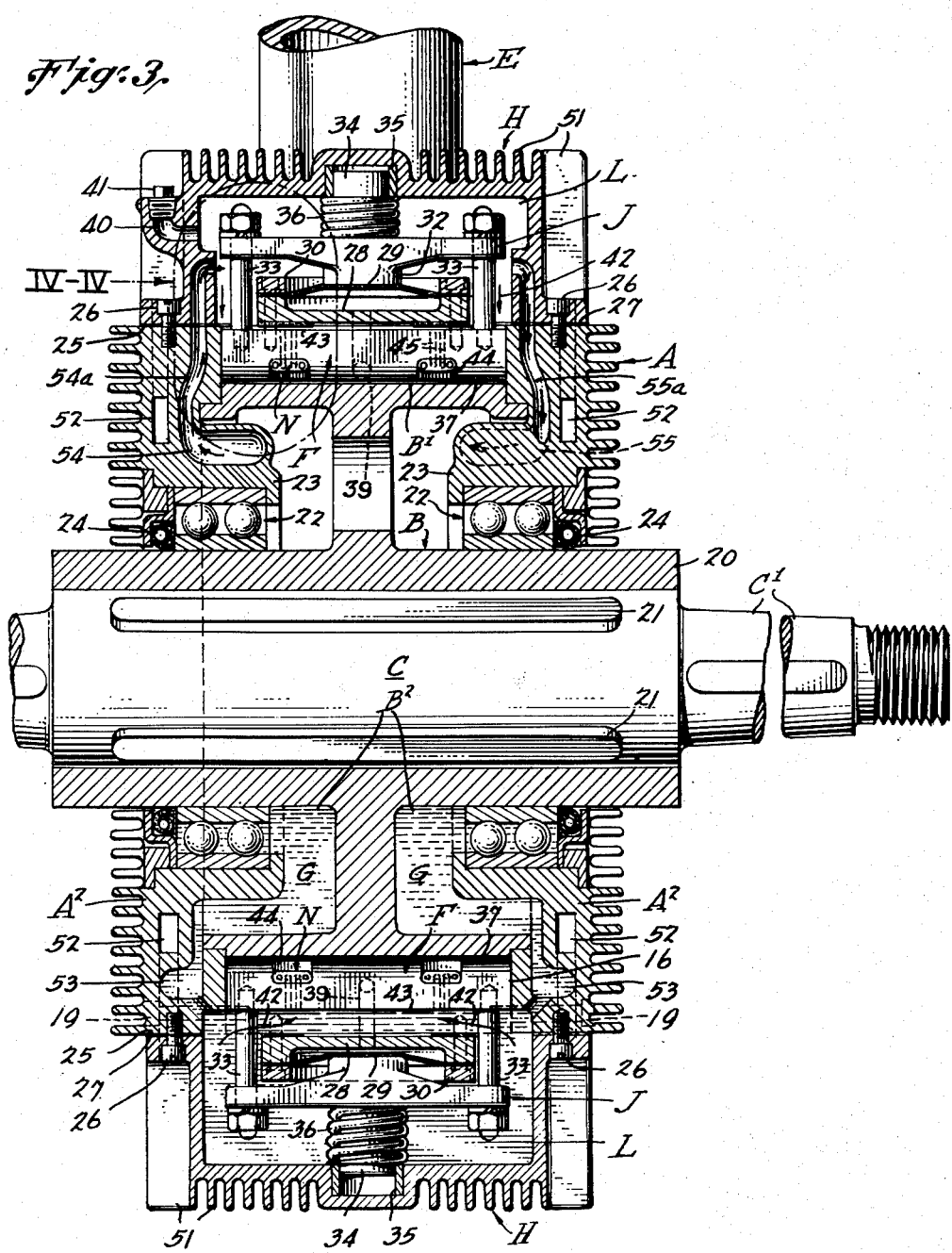

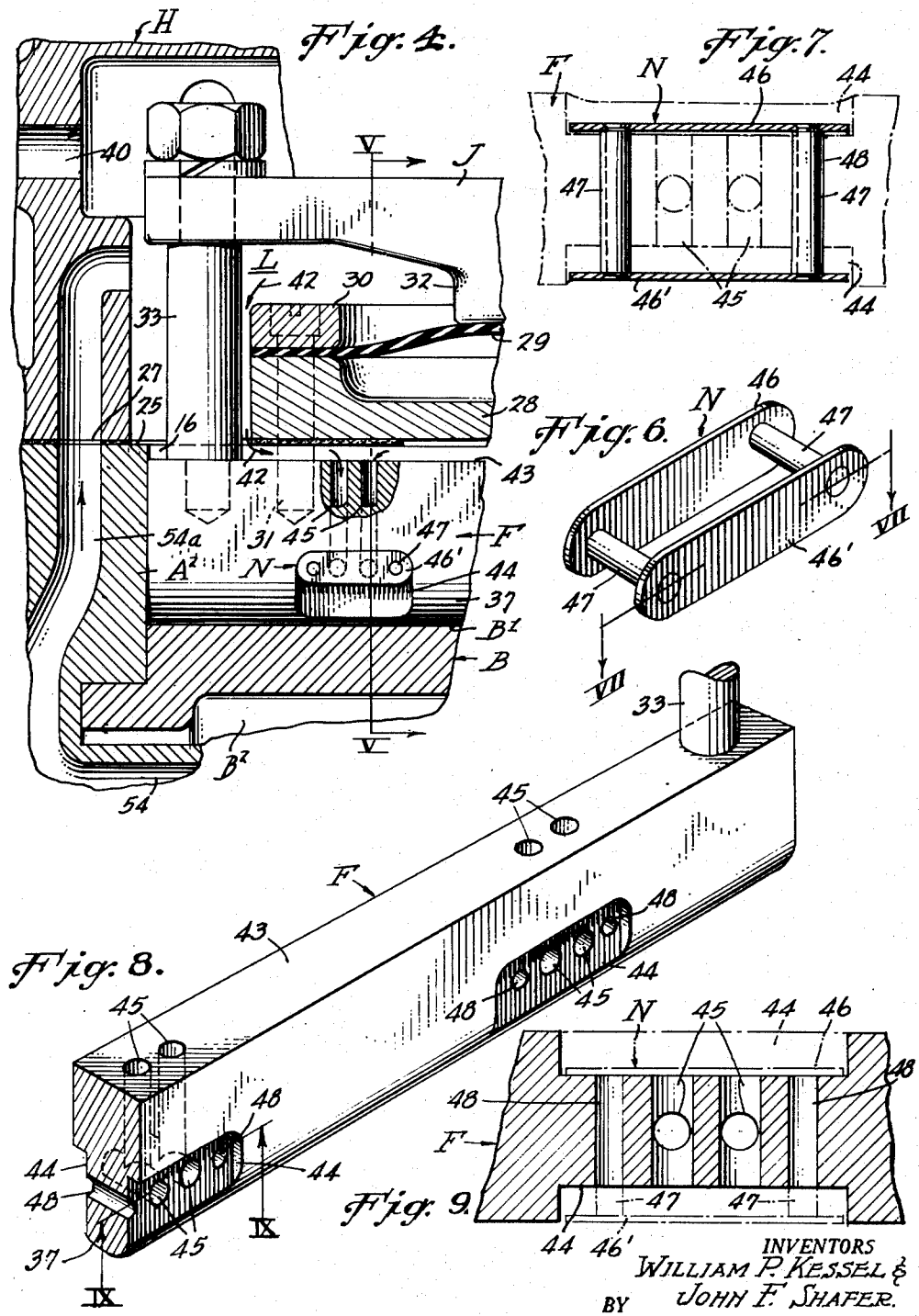

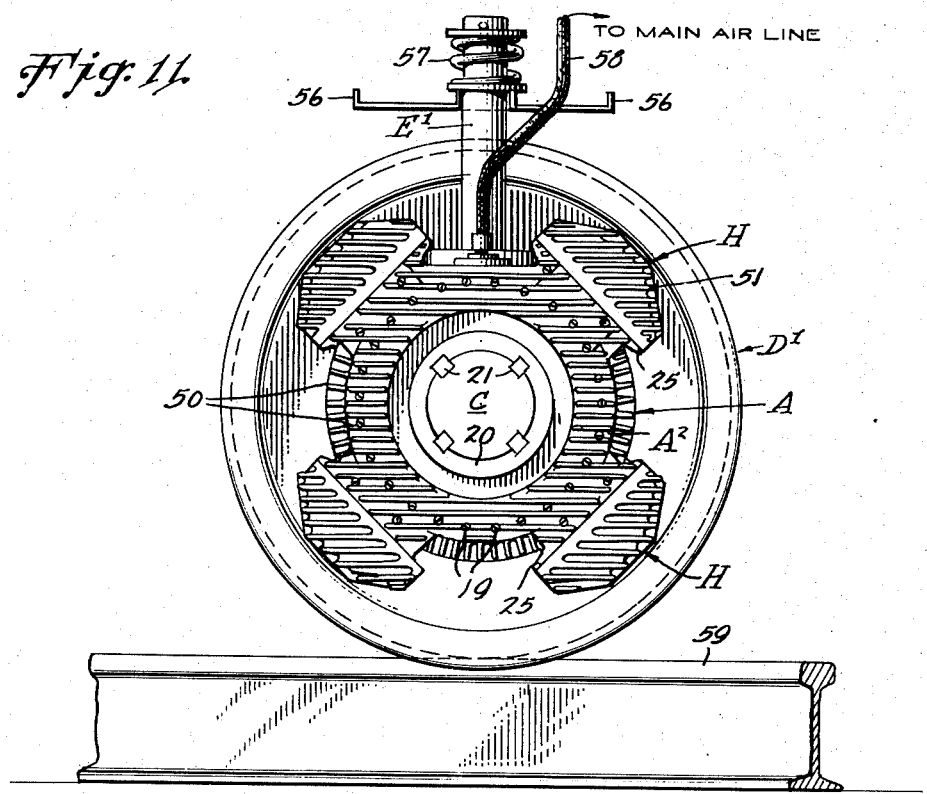
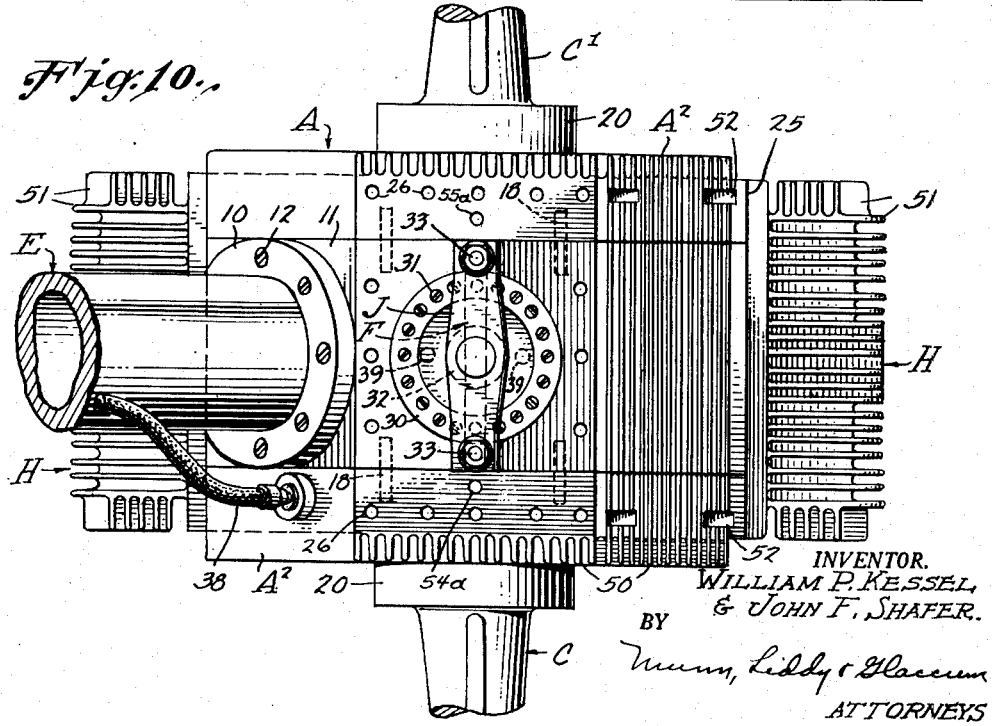

Patented Sept. 9, 1952

2,609,894

UNITED STATES PATENT OFFICE 2,609,894

SELF-POWERING FLUID BRAKE

William P. Kessel and John F. Shafer, San Francisco, Calif.; said Shafer assignor to said Kessel Application July 12, 1949, Serial No. 104,258

7 Claims. (Cl. 188—90)

1

The present invention relates to a self-powering fluid brake. It consists of the combinations, constructions, and arrangement of parts, as hereinafter described and claimed. This brake is both fluid brake and friction brake in one. It brakes the axle to a stop by compression of fluid, and locks the axle by direct centripetal, mechanical pressure by gates against the peripheral contours of the rotor.

In times of antiquity, when the wheel and axle were developing, man was brought face to face with the first braking problem. However, man applied the lever and a block to the rim of the wheel, and solved the problem by manipulating the lever by manual operation and control.

This original braking principle served its purpose adequately during the long ages of slow transportation; but, as the wheel and axle improved, and as transportation began a faster tempo, the manual brake lever became inadequate. In modern times, it has been replaced by hydraulic or pneumatic compound brake levers.

The increase in commercial present day braking capacities over those of ancient times, therefore, has been gained by adding greater pressure to the brake lever, either hydraulically, pneumatically, or by other means, but not by improving the principle of the ancient method of braking by friction.

However, the truth of the matter is that the friction brake principle, antique or modern, is entirely inadequate for sustained high speed velocities; and long since has reached and passed its limitation for modern transportation purposes, as the heat problem becomes insurmountable and extremely dangerous for operation under modern spaced requirements.

In the present invention, the stored energy of a rotating axle—its momentum—is utilized in braking its own velocity to a stop and quickly bringing the axle to rest. The self-powering fluid brake herein disclosed introduces a new principle in braking, whereby the momentum of the rotating axle is converted (through the medium of fluid) into usable braking power when the fluid medium, set into motion by the revolving wheel, is trapped. The gradual trapping of the fluid medium which has been set in motion by the revolving wheel, retards the velocity of the wheel and axle and brings both to rest. More specifically, this usable power is utilized to compress fluid against compression gates, thereby retarding the velocity and bringing the axle to rest.

As the specification continues, it will be obvious that our self-powering fluid brake is adapted for airplanes, railroads, street cars, trucks, etc. Aside from the smooth, noiseless, air-cooled efficiency of our fluid brake, the importance should be observed of how little hydraulic or compressed air equipment is required for operating the fluid brake, as against the complicated, cumbersome and costly auxiliary air tank or hydraulic equipment required to operate the friction brake system now in use.

Other and more specific objects will appear as the specification proceeds. The novel features of our invention will be set forth in the claims hereunto appended.

For a better understanding of our invention, reference should be had to the accompanying drawings, forming part of this application, in which:

Figure 2 is a vertical longitudinal sectional view taken through the mid-portion of the same brake;

Figure 3 is a transverse sectional view taken along the line III—III of Figure 2;

Figure 4 is an enlarged sectional view of that portion enclosed by the oval IV—IV in Figure 3;

Figure 6 is an isometric view of one of the shutter valves that we employ;

Figure 7 is a horizontal sectional view taken along the line VII—VII of Figure 6;

Figure 8 is a perspective view of one of our compression gates, partly in section;

Figure 9 is a transverse sectional view taken through a portion of this compression gate, as seen from the line IX—IX of Figure 8;

Figure 10 is a plan view taken along the inclined plane X—X of Figure 2, parts being omitted; and Figure 11 discloses our brake applied to a railroad wheel.

While we have shown only the preferred forms of our invention, it should be understood that various changes, or modifications may be made within the scope of the annexed claims, without departing from the spirit thereof.

Detailed description

In carrying our invention into practice, we provide a stator or casing indicated generally at A having a rotor or impeller B revolvably mounted therein. The rotor has shaft C fixed thereto and projecting from the stator. For this purpose of illustration, we have shown an airplane wheel D in Figure 1, which is secured to the projecting end C1 of the shaft. Of course, we do not desire to be limited to this particular type of a wheel.

Figure 1:
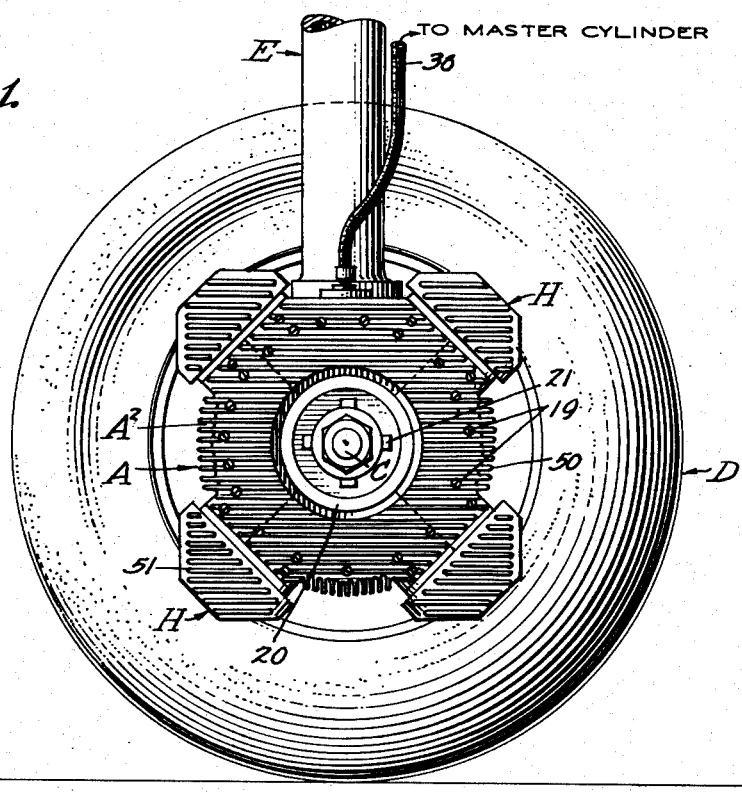
Figure 1 is a side elevation of our self-powering fluid brake, as applied to the wheel of an airplane.

It is obvious that this wheel could be a wheel of a truck, automobile, etc. As a matter of fact, Figure 11 discloses the shaft C as being secured to a railroad wheel D1. As illustrated in Figures 1 to 3, inclusive, a landing gear leg and torque arm E is provided with a flange 10 on its lower end, which is secured upon an upper flat surface 11 of the stator A by cap-screws 12, or other suitable fastening means.

Broadly speaking, the rotor B is fashioned with a cam surface B1 on its periphery defining alternate lobes 14 and intervening valleys 15. The lobes and valleys extend from end to end of the rotor in parallel relation with the axis thereof. In Figure 2, we have shown five such lobes on the cam surface B1, although we do not wish to be confined in this respect. The stator A is provided with a plurality of compression gates F, which are slidably mounted in radially-extending slots 16 fashioned in the stator.

The compression gates are movable toward and away from the cam surface B1 of the rotor or impeller B by means hereinafter described. The interior of the stator defines a cylinder wall 17 against which the lobes 14 bear with a fluid tight connection therebetween. Referring to Figure 2, it will be noted that the lobes 14, valleys 15 and wall 17 cooperate to define five pockets in which braking fluid G is disposed. The axle C and its rotor B rotate freely when the compression gates F are withdrawn completely from the cylindrical confines of the wall 17. However, as these gates are moved inwardly toward the axle C, braking force is furnished by the axle's momentum in compressing the braking fluid G against the four compression gates.

In other words, as the compression gates are moved outwardly away from the axle C, the braking action upon the rotor will decrease; conversely, as these gates are moved inwardly toward the axle C, the braking action will increase upon the rotor. When the gates are moved inwardly to the full extent permitted by the bottoms of the valleys 15, the brake will be set, holding the rotor B and therefore bringing the axle C to a stop. The means for actuating the gates will be set forth later.

For simplicity of construction, the stator is made in quarter segments A1, which are arranged in end-to-end relation in the manner shown in Figures 1 and 2. Each segment extends between two adjacent compression gates. Cover plates A2 are fitted against opposite ends of the assembled segments A1 and close the ends of the bore provided by the cylindrical wall 17. Dowel pins 18 (see Figures 2 and 10) and cap-screws 19 (see Figures 1 and 3) hold the quarter segments A1 of the rotor and the cover plates A2 in assembled relation. The gates F extend between the opposing cover plates A2. (See Figures 3 and 4).

The rotor includes a sleeve or hub 20 formed integral therewith. This sleeve is pressed onto the axle C and is held against rotation with respect to the axle by keys 21 (see Figure 3). In an emergency, the brake rotor B can be pressed off and replaced by another unit. Bearings 22 are interposed between the sleeve or rotor hub 20 and inwardly extending flanged hubs 23 provided on the cover plates A2 in the manner shown in Figure 3. These bearings support the rotor B. Oil seals 24 prevent escapement of the braking fluid G between the stator and the rotor.

The stator A and cover plates A2 are provided with flat surfaces 25, see Figure 2, which are arranged 90° from one another. Housing caps H are secured over these flat surfaces by cap-screws 26. Gaskets 27 are interposed between the surfaces 25 and the caps H to form a liquid-tight seal therebetween. Moreover, it will be noted from Figures 2 to 4, inclusive, that perforated base cups 28 are housed within the interiors of the caps H. Flexible diaphragms 29 are secured over the rims of these base cups by retaining rings 30. Cap-screws 31 anchor the base cups 28, diaphragms 29 and retaining rings in place. At least part of these cap-screws extend into the stator, as shown in Figure 2. Other cap-screws 31 may extend only through the rings 30 into the base cups.

The diaphragms 29 are made of flexible steel, or other suitable material, and preferably are circular in shape. The central portions of these diaphragms abut the bosses 32 formed on cross-arms J. The latter are interconnected with the compression gates F by studs 33, which are disposed beyond the rings 30 (see Figures 3, 4 and 10). The cross-arms J are provided further with central projections 34, which are slidably disposed in guide bushings 35 carried by the housing caps H. Springs 36 are interposed between the bushings 35 and the cross arms J so as to yieldingly urge the latter toward the axle C. Accordingly, the springs 36, through the cross arms and studs 33, will urge the compression gates F against the cam surface B1 of the rotor.

When the diaphragms 29 are extended outwardly, that is, away from the axle C, the compression gates F are withdrawn relative to the peripheral cam surface B1 of the rotor. Of course, in the event that these gates are withdrawn only partially, inner rounded ends 37 of the gates still will contact with the lobes 14 on the rotor as the latter is rotated. This will result in a partial braking action on the rotor, as will be explained later. However, when the gates are completely withdrawn until their rounded ends 37 register with the cylindrical wall 17, the rotor B is free to rotate in the stator. At this time, the body of braking fluid G disposed in the pockets formed by the valleys 15 (see Figures 2 and 5) will move with the rotor.

Figure 5:
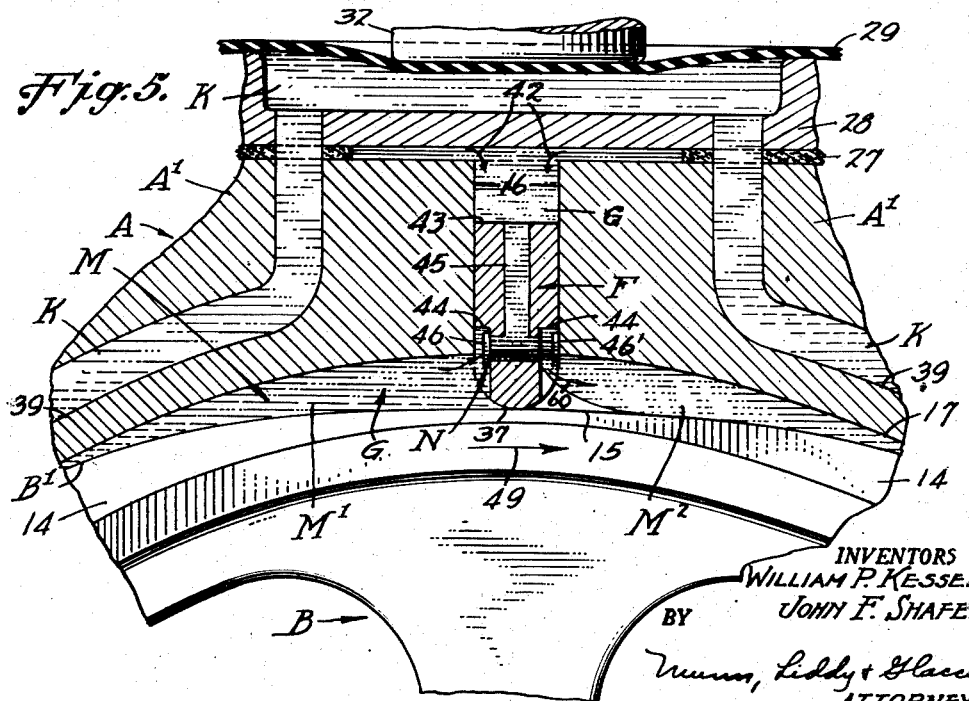
Figure 5 is a sectional view taken along the line V—V of Figure 4.

For the purpose of flexing the diaphragms 29 outwardly, we make use of control fluid K (see Figures 2 and 5). This fluid is delivered from a master cylinder of conventional design (not shown) to a conduit 38 (see Figures 1 and 2), and flows through passageways 39 provided in the stator to the interiors of all of the base cups 28. Figure 2 shows the passageways interconnecting the interiors of adjacent base cups. When it is desired to free the axle C and the rotor B—in other words to release the brakes—hydraulic pressure from the master cylinder is forced over the conduit 38 and through the passageways 39. This will extend the diaphragms 29 outwardly against the action of the springs 36, thus retracting the compression gates F. In applying the brakes, the hydraulic pressure is lowered in the master cylinder, causing the diaphragms to retract toward the axle C, whereby the springs 36 will extend and close the compression gates F against the cam surface of the rotor.

The supply of braking fluid G is delivered to the interior of the upper housing caps H through filling passageways 40 after plugs 41 have been removed (see Figure 3). All four of the caps H define reservoirs L for holding braking fluid. This fluid flows from the reservoirs L directly into the outermost ends of the slots 16 in which the compression gates are mounted, as suggested by the arrows 42 in Figures 3 and 4.

Thus the braking fluid G is delivered to the outermost flat faces 43 of the compression gates F. The latter are provided with recessed seats 44 in their opposing faces, as clearly shown in Figures 3-5 and 7-9. We have disclosed T-shaped bores 45 leading from the outer faces 43 of the compression gates F to the recessed seats 44 through which the braking fluid G may flow.

As previously stated, the valleys 15 of the cam surface B1 of the rotor B and cylindrical wall 17 of the stator A coact to define peripheral pockets adapted for receiving braking fluid G. These pockets are designated at M in Figures 2 and 5. Shutter valves N are provided for controlling flow of the braking fluid G from the T-shaped bores 45 of the compression gates F to the pockets M.

Referring to Figures 4 to 9, inclusive, the shutter valves N include parallel plates 46 and 46', which are arranged to be received in the recessed seats 44 of the compression gates. These plates are interconnected by cross bars 47 slidably disposed in transverse openings 48 fashioned in these gates. Assuming that the rotor B is turning in the direction of the arrow 49 in Figure 5, the braking fluid G in the left-hand pocket portion M1 will be crowded toward the compression gate F, thereby seating the plate 46 against the recessed seat 44 in the gate. At the same time, the plate 46' will be moved away from its recessed seat 44 in the compression gate.

Thus the braking fluid G in the pocket portion M1 will be trapped and provide a braking action on the rotor. However, the plate 46' has been extended; accordingly, braking fluid G will flow from the bores 45 into the right-hand pocket portion M2 to replenish fluid therein. Thus the reservoirs L will constantly refill the braking fluid in the pockets M, regardless of the direction in which the rotor B is turned. The valves N are stationary relative to the gates F during braking, either forward or reverse. These valves permit fluid G to be drawn into the suction portion of the pockets M.

It is quite obvious from Figure 5 that when sufficient hydraulic control fluid K has been injected underneath the diaphragms 29 to move the compression gates F outwardly until their rounded ends 37 register with the cylinder wall 17, the rotor B will be free to rotate. However, as the control fluid K is withdrawn from the base cups 28, the springs 36 will force the compression gates F into the pockets M. As the gates are projected into the pockets M, a braking action will be applied against the rotor B. When these gates are moved inwardly until they contact with the bottoms of the valleys 15, no further flow of the braking fluid G can by-pass the compression gates. At this time, the rotor B is brought to rest.

Very little energy is required to operate the compression gates. However, a great disbursement of power is effected by the axle's momentum as the rotor or impeller is forced to compress the fluid G against the closing compression gates, causing the stored energy to dissipate and retard its velocity—wherefore the axle C is brought quickly to rest, by force of its own momentum. The self-powering fluid brake is a brake for safety; it can be applied with great force at highest velocity—without locking the brake and without fear of overheating. The incompressibility of the fluid G makes braking capacities limited to structure and strength of material.

In order to reduce the temperature of the brake, the stator A and housing caps H are provided with fins 50 and 51, respectively. Moreover, open-ended wind tunnels 52 are fashioned in the cover plates A2, which open to the atmosphere. Moderate temperature increases have been recorded carefully during scale model braking tests, and indicate that heat increases are dissipated entirely by cooling fin radiation and by circulation of the braking fluid G through air-cooled sumps 53 (see Figure 3). These sumps are adjacent to the wind tunnels 52 but are separated therefrom.

This type of brake will operate for long periods without any attention whatever. There is nothing to replace, reline or to warp or twist. The brake mechanism operates easily in a continually circulating bath of air-cooled lubricating fluid.

For the purpose of returning braking fluid G from the interior compartment B2 of the rotor B back to the reservoirs L, we provide funnels 54 and 55 (see Figures 2 and 3). These funnels scoop into the braking fluid contained within the rotor. When the rotor is turned in a counter-clockwise direction, in Fig. 2, the funnel 54, shown on the far side of the stator plate, delivers scooped fluid through a passageway 54a to the upper left-hand reservoir L in Fig. 2. Figure 3 shows a passage 55a leading from the upper left hand compartment of Fig. 2, and communicating with a funnel 55 that faces in the opposite direction to the funnel 54. There will therefore be a continual flow of fluid into and out of this compartment. In like manner, the other upper compartment will have a continual flow of fluid into it and out from it. The flow into and out of both upper compartments will be continuous regardless of the direction of rotation of the rotor. The lower reservoirs L are replenished by gravity flow of fluid.

In Figure 11, the torque arm E1 rides freely between two cross channels 56, which are bolted to a truck frame (not shown). The weight of the brake is carried by the torque arm compression spring 57. The hose 58 connects to a main air line and this air is utilized for operating the diaphragms 29 in the same manner previously described. The flanged wheel D1 in this view has been shown as riding on a rail 59.

This type of a railroad brake goes on automatically when the air pressure is released in the main line. If the air goes off entirely, the brakes will be set and automatically lock the axles. To free the brakes, compressed air is admitted over the hose 58 to operate the diaphragms contained in the cup housings H. A railroad car on a siding with locked wheels, without auxiliary air tank, but equipped with our self-powering fluid brakes, may be released readily and operated with a small hand pump (not shown).

A train equipped with our self-powering fluid brakes does not need auxiliary air tank equipment, particularly for the reason that the actual braking is not done by air pressure; consequently, the air is not in demand when the actual braking takes place.

In our brakes, the compressed air is caused to do its work beforehand, that is, the compression springs 36 are compressed at the time the brakes are released by withdrawing the compression gates F. These springs are held under compression until the air is released again from underneath the diaphragms 29, when the springs 36 extend and apply the gates F against the cam surface B1 of the rotor or impeller B. Inasmuch as the air is applied only when the brakes are released, and the air volume is relatively small per brake, the supply lines 58 are connected directly to the main line, which runs through all the cars.

Before starting a run with a self-powering fluid brake-equipped train, the engineer lets the air into the main line. This will release all the brakes, putting all the springs 36 under compression, ready for braking the instant the air is released from the main line as the train rolls on. The self-powering fluid brake functions smoothly and noiselessly, and brakes against the axle C—wherefore the braking is applied equally to each wheel D1 and to all the wheels of the entire train. These brakes not only eliminate auxiliary air tanks, but also do away with brake shoes, brake beams, levers, rods and pistons, leaving the underneath side of the cars clear and free from obstructions.

In short, when you have no air in the present-day railroad brakes of conventional design, you have no brakes. When you have no air in our self-powering fluid brakes, your brakes are set and the wheels D1 are locked permanently until released.

On railroads today, the main air line originates at the locomotive, and is coupled from car to car; that is, connected to the auxiliary air tank of each car throughout the entire train. When the air is first turned into the main line, all the auxiliary air tanks fill up to the required pressure, but that does not apply the brake shoes. It is when the air pressure is lowered in the main line that automatic valves, on all the auxiliary air tanks, open and admit air pressure to the brake beam pistons. Then the latter pull the levers and rods that apply the brake shoes against the wheels and stop the train.

This conventional arrangement provides for this safety feature: in case of derailment, when the main air line breaks, all the auxiliary air tanks immediately set the brakes and lock the wheels. This is the best railroad brake system evolved up to these times, but it is very cumbersome, complicated and costly. Then, of course, the air leaks out before so very long.

On a train with half of the cars equipped with the conventional friction brake shoes, and the other half of the cars with our fluid brakes and the cars alternately coupled—the engineer lets the air into the main line in the usual manner. On all the brake shoe cars, the auxiliary tanks will fill up to the required pressure; and on all the fluid brake cars the diaphragms 29 will extend and withdraw the compression gates F from the cam surfaces B1, so all the wheels D1 are free to roll. The pressure in the main line is maintained in the usual manner as the train pulls out. All brake shoe pistons, as well as all compression gates F, are ready to function, in unison, the instant the pressure is lowered in the main line, as the train rolls on.

When the engineer does lower the pressure in the main line, all the brakes go on, brake shoes as well as our fluid brakes. However, the brake shoes heat instantly, getting hotter and hotter, while heat increases are entirely dissipated in our fluid brakes, by cooling fin radiation from the fins 50—51 and by circulation of the braking fluid G through the air cooled sumps 53.

When the conventional brakes are set and the wheels are locked, the brake shoes, if not too hot, will hold as long as the air pressure is up. Our fluid brakes will hold permanently until released.

In our brakes, the lateral force against the compression gates F, which in conjunction with the centripetal force of the compression springs 36, overcomes the radial force of the braking fluid G, and prevents the gates from being pressed outwardly during the brakeage action. The gates offer much larger lateral than radial surface to the fluid G.

With reference to the heat problem, conventional brake linings need to be replaced, at frequent intervals, on heavy timber and dirt-moving trucks, operating off the roads. Such conditions also prevail on many railroads, on grades where new brake shoes are installed after each run. With airplanes, in view of the enormous peak power, the heat problem in friction brakes is perhaps the most dangerous and most difficult of all. In emergency landings, the tires most often burst into flames and destroy the people and the plane.

Summary of operation

The operation of our self-powering fluid brake is summarized briefly as follows:

Assuming that it is desired to rotate the stator or impeller B freely in the direction of the arrows 49 in Figures 2 and 5, the master cylinder (not shown) is operated to force the control fluid K through the conduit 38 and into the passageways 39. This control fluid will become active on the inner surfaces of the diaphragms 29, forcing them outwardly against the action of the compression springs 36.

This outward bulging of the diaphragms in a direction away from the axle C will force the cross arms J outwardly, and through the studs 33, the compression gates F will be moved outwardly from the cam surface B1 of the rotor B. When the rounded inner ends 37 of these gates register with the cylindrical wall 17 of the stator, the rotor B will rotate unimpeded by the braking fluid G disposed in the pockets M of the rotor or impeller. The body of fluid G contained in these pockets will move with the rotor.

When it is desired to apply a braking action to the rotor B and its axle C, the master cylinder is actuated to withdraw control fluid K through the conduit 38 from the passageways 39. This will allow the compression springs 36 to expand, moving the gates F toward the axle C. The braking fluid G in the pocket portions M1 (Figure 5) will cause the plates 46 of the shutter valves N to close against the gates in the manner shown in Figure 5.

As the gates move toward the cam surface B1 of the rotor, the flow of the braking fluid G underneath the inner rounded ends 37 of the gates from the pocket portions M1 to the pocket portions M2 will be reduced gradually. This will result in gradually applying a braking action to the rotor. When the rounded ends 37 of the gates are projected inwardly until they reach the bottoms of the valleys 15, the rotor B will be brought to rest.

Suction established in the pocket portions M2 will draw braking fluid G from the reservoirs L. This fluid will flow through the bores 45 in the compression gates. Inasmuch as the plates 46' of the shutter valves N are open at this time, braking fluid G in the bores 45 will be drawn into the suction portions M2 of the pockets M, as suggested by the arrow 60 in Figure 5.

During rotation of the rotor or impeller B in a clockwise direction in Figure 2, braking fluid G in the interior of the rotor will be scooped up by the funnel 55. This fluid will be delivered by the passageway 55a to the upper right-hand reservoir L in this view to replenish the supply therein. As previously stated, there will also be an outflow of liquid from this reservoir. In like manner the upper left-hand reservoir will have fluid flowing continuously therethrough. Both upper reservoirs will have fluid continuously flowing therethrough regardless of the direction of rotation of the rotor. Braking fluid G is delivered by gravity to the lower reservoirs L to maintain the supply therein.

We claim:

1. In a brake of the character described; a stator having a bore defining a peripheral wall; a rotor arranged in the bore with portions of the rotor contacting with the peripheral wall; the rotor having a plurality of pockets formed in its periphery in which a braking fluid is disposed; a compression gate slidably carried by the stator and movable toward and away from the rotor; including movement into and out of the pockets in the rotor; means for moving the gate toward the rotor; means for retracting the gate away from the rotor; and means for delivering braking fluid through the gate to the pockets, and including a shutter valve for preventing any return flow of the braking fluid through the gate.

2. In a brake of the character described: a stator having a bore defining a peripheral wall; a rotor arranged in the bore with portions of the rotor contacting the peripheral wall; the rotor having a plurality of pockets formed in its periphery for reception of a braking fluid; a compression gate slidably carried by the stator and movable toward and away from the rotor, including movement into and out of the pockets in the rotor; yielding means urging the gate toward the rotor; a reservoir containing braking fluid; and means for delivering braking fluid from the reservoir to the pocket ahead of the gate during rotation of the rotor, and including a passage in the gate, opening on both sides thereof with a shutter valve for automatically closing the opening in the gate passage not communicating with the pocket disposed ahead of the gate.

3. In a brake of the character described: a stator having a bore defining a peripheral wall; a rotor arranged in the bore with portions of the rotor contacting the peripheral wall; the rotor having at least one pocket formed in its periphery for reception of a braking fluid; a compression gate slidably carried by the stator and movable toward and away from the rotor, including movement into and out of the pocket in the rotor; yielding means urging the gate toward the rotor; a reservoir containing braking fluid; and means for delivering braking fluid from the reservoir to the pocket ahead of the gate during rotation of the rotor; the fluid-delivering means including a passageway leading from the reservoir through the gate with an automatic valve for opening the passage only to the pocket ahead of the gate.

4. In a brake of the character described: a stator having a bore defining a peripheral wall; a rotor arranged in the bore with the portions of rotor contacting the peripheral wall; the rotor having at least one pocket formed in its periphery for reception of a braking fluid; a compression gate slidably carried by the stator and movable toward and away from the rotor, including movement into the out of the pocket in the rotor; a reservoir containing braking fluid; means for delivering braking fluid from the reservoir to the pocket in the rotor, and including a T-shaped passageway in the gate having fluid outlets leading to opposing faces of the gate; a reciprocable shutter valve slidably carried by the gate, and having a pair of spaced-apart plates disposed on said opposing faces of the gate; means for holding the plates a predetermined distance apart; one of the valve plates being arranged to close the fluid outlet on its face of the gate when this plate is moved toward the gate; the other valve plate being arranged to close the fluid outlet on its face of the gate when this plate is moved toward the gate; the plates being movable into the braking fluid disposed in the pocket when the gate is moved into the pocket.

5. In a brake of the character described: a compression gate having a T-shaped passageway defining a fluid-inlet at the top of the gate; the passageway further defining fluid outlets leading to opposing faces of the gate; and a reciprocable shutter valve slidably carried by the gate, and having a pair of spaced-apart plates disposed on said opposing faces of the gate; means for holding the plates a predetermined distance apart; one of the valve plates being arranged to close the fluid outlet on its face of the gate when this plate is moved toward the gate; the other valve plate being arranged to close the fluid outlet on its face of the gate when this plate is moved toward the gate.

6. In a brake of the character described: a stator having a bore defining a peripheral wall; a rotor arranged in the bore with portions of the rotor contacting the peripheral wall; the rotor having at least one pocket formed in its periphery for reception of a braking fluid; a compression gate slidably carried by the stator and movable toward and away from the rotor, including movement into and out of the pocket in the rotor; yielding means urging the gate toward the rotor; a reservoir in the stator containing braking fluid; means including passages in the gate for delivering braking fluid from the reservoir to the pocket ahead of the gate during rotation of the rotor; the rotor having a compartment therein holding braking fluid; and means for automatically transferring braking fluid from the compartment to the reservoir to replenish the supply in the reservoir, the stator having end walls constituting covers for the rotor compartment, these walls also forming the sides for the rotor pocket, whereby any leakage of braking fluid from the pocket and along the walls will pass to the compartment.

7. In a brake of the character described; a stator having a bore defining a peripheral wall; a rotor arranged in the bore with portions of the rotor contacting the peripheral wall; the rotor having at least one pocket formed in its periphery for reception of a braking fluid; a compression gate slidably carried by the stator and movable toward and away from the rotor, including movement into and out of the pocket in the rotor; a cross-arm interconnected with the gate to move both in unison; a base cup having a flexible diaphragm sealed thereto and forming a compartment for reception of a control fluid; the diaphragm being arranged to lift the cross-arm and withdraw the gate from the pocket of the rotor when control fluid is forced into the compartment; means for forcing control fluid into the compartment and for withdrawing control fluid therefrom; and yielding means bearing against the cross-arm tending to urge the cross-arm and the compression gate toward the rotor, said last-named means locking the rotor permanently by centripetal mechanical pressure when pressure on the control fluid is entirely relieved.

WILLIAM P. KESSEL.
JOHN F. SHAFER.

REFERENCES CITED

The following references are of record in the file of this patent:

UNITED STATES PATENTS

| Number | Name | Date |
|---|---|---|
| 951,607 | Harper | Mar. 8, 1910 |
| 1,940,924 | Walker | Dec. 26, 1933 |
| 2,238,786 | Warman | Apr. 15, 1941 |
| 2,248,684 | Levy | July 8, 1941 |

FOREIGN PATENTS

| Number | Country | Date |
|---|---|---|
| 18,316 | Great Britain | Sept. 13, 1901 |